Patented Jan. 9, 1923.

1,441,792

UNITED STATES PATENT OFFICE.

WILLIAM OSBORNE GARBUTT, OF GLOUCESTER, ENGLAND.

ELECTRIC ACCUMULATOR.

No Drawing.   Application filed June 19, 1922.   Serial No. 569,428.

*To all whom it may concern:*

Be it known that I, WILLIAM OSBORNE GARBUTT, a subject of the King of Great Britain and Ireland, residing at Gloucester, in the county of Gloucester, England, have invented Improvements in or Relating to Electric Accumulators, of which the following is a specification.

Electric accumulators of the ordinary type comprising lead electrodes immersed in a dilute solution of sulphuric acid, are liable, under certain circumstances, to become what is known as sulphated, which condition seriously interferes with their efficiency and proper working and may even in extreme cases, put them out of action.

For desulphating a sulphated accumulator with the object of restoring it to its normal working condition, the lead electrode plates have sometimes been removed from the accumulator cell and the solid sulphate of lead removed from the surfaces of the plates, as by scraping, and washing in water or weak sulphuric acid, or, in cases where the sulphating is not very bad, the plates have been subjected to prolonged charging with a weak electric current, the acid electrolyte still remaining in the cell. Also, it has been proposed to pass a very weak electric current, say of a density of from 10 to 25 amperes per square metre of the surface of the positive electrode, at an E. M. F. of about two to three volts and for from four days to about three or more weeks, according to the state of the electrodes, through the sulphated electrodes while immersed in an electrolyte consisting of a very dilute solution of sulphate of potassium, sodium or magnesium produced by adding to the accumulator cell, after removing the ordinary acid electrolyte therefrom, a very dilute solution of sulphate of potassium, sodium of magnesium, or of potassium or sodium carbonate, borate or hydro-oxide which becomes converted into an alkaline sulphate by reaction with the sulphuric acid remaining in the cell, the alkaline sulphate being slightly acid during the electrolytic treatment. These methods are expensive, troublesome, take considerable time and are otherwise disadvantageous.

Now the present invention has for its object to enable the electrodes of an electric accumulator of the type referred to, that have become sulphated, to be effectually desulphated in an easy, quick and economical manner by means of a current of the density ordinarily used for charging the accumulator and this, if desired, without removing the electrodes from their cell.

For this purpose, the lead electrodes of an electric accumulator of the kind referred to, that have become sulphated, are first freed from the dilute sulphuric acid electrolyte with which they had previously been used, and are then subjected to a desulphating treatment by passing an electric current through them whilst immersed in a strong solution of an alkaline hydroxide or peroxide, the current being of a density such as ordinarily used for charging the accumulator, and the solution being at all times maintained in an alkaline condition. In this way the electrodes can be thoroughly desulphated in from four to twenty-four hours without removing them from their cell and with the ordinary charging dynamo set or plant provided for charging accumulators, the charging rate of which is about one ampere for each eight to twelve square inches of electrode surface, at the ordinary charging voltage of about two to three volts.

According to one way of carrying out the invention, the sulphuric acid electrolyte is removed from the accumulator cell, and any deposited sulphate of lead washed out with water, after which the accumulator cell is charged with the alkaline desulphating liquid or electrolyte hereinbefore described and the accumulator electrically charged, or electrically charged and discharged, in any of the well known ways and under the charging conditions ordinarily adopted as hereinbefore stated. In addition, the desulphating liquid may be gently shaken or agitated in contact with the electrodes to facilitate its action thereon. In this way, the desulphating of the electrodes can be carried out in a comparatively rapid and convenient manner and in situ, that is to say, without removing the electrodes from the accumulator cell. Satisfactory results can be obtained with an alkaline desulphating liquid having a specific gravity of about 1100, as indicated by an ordinary hydometer where water would be indicated at 1000, or say a 10% solution of the alkaline hydroxide or peroxide. Such a strength of solution will prevent the accumulator cell, when made of celluloid, as is usual, being injuriously affected by the solution, otherwise the solution could be of greater strength.

The desulphating liquid used may advantageously consist of an aqueous solution of sodium hydroxide, or of sodium peroxide, which, by reaction with the sulphate of lead on the electrode, under the conditions of electrical charging above refered to, will reduce the sulphate of lead and form peroxide of lead on the positive plates or electrodes and spongy metallic lead on the negative plates or electrodes, the resulting sulphate of the alkali used being dissolved in the solution which is at all times maintained in an alkaline conditon. The plates or electrodes will not be injuriously affected by such a solution either before, during or after the electrical charging referred to.

When the desulphating treatment is completed, which can be readily determined, by inspection in the usual manner, the passage of an electric current is stopped and the resulting liquid removed from the cell and replaced with the usual dilute solution of sulphuric acid. Or, the desulphating solution may be allowed to remain in the cell to constitute the exciting liquid in the subsequent working of the accumulator.

If desired, the sulphated plates or electrodes may be removed from the accumulator cell for treatment in a separate vessel with the desulphating liquid under the condition of electrical charging as above described. This treatment in a separate vessel is however not necessary for successfully carrying out the invention.

What I claim is:—

1. The method of desulphating the sulphated lead electrodes of an electric accumulator by first freeing them from the sulphuric acid electrolyte with which they have been used and then electrically charging them whilst immersed in a strong solution of an alkaline oxide the current being of a density such as ordinarily used for charging the accumulator and the solution being at all times maintained in an alkaline condition, substanially as described.

2. The method of desulphating the sulphated lead electrodes of an electric accumulator by first freeing them from the sulphuric acid electrolyte with which they have been used and then electrically charging them whilst immersed in a strong solution of an alkaline hydroxide.

3. In the method of desulphating sulphated lead electrodes according to claim 1, the employment as the desulphating liquid, of a strong solution of an oxide salt of sodium, substantially as described.

4. In the method of desulphating sulphated lead electrodes according to claim 1, the employment as desulphating liquid, of a strong solution of sodium hydroxide, substantially as described.

Signed at Cardiff, Wales, this 1st day of June, 1922.

WILLIAM OSBORNE GARBUTT.